Oct. 9, 1945. G. A. LYON 2,386,224
WHEEL STRUCTURE
Original Filed Nov. 25, 1940
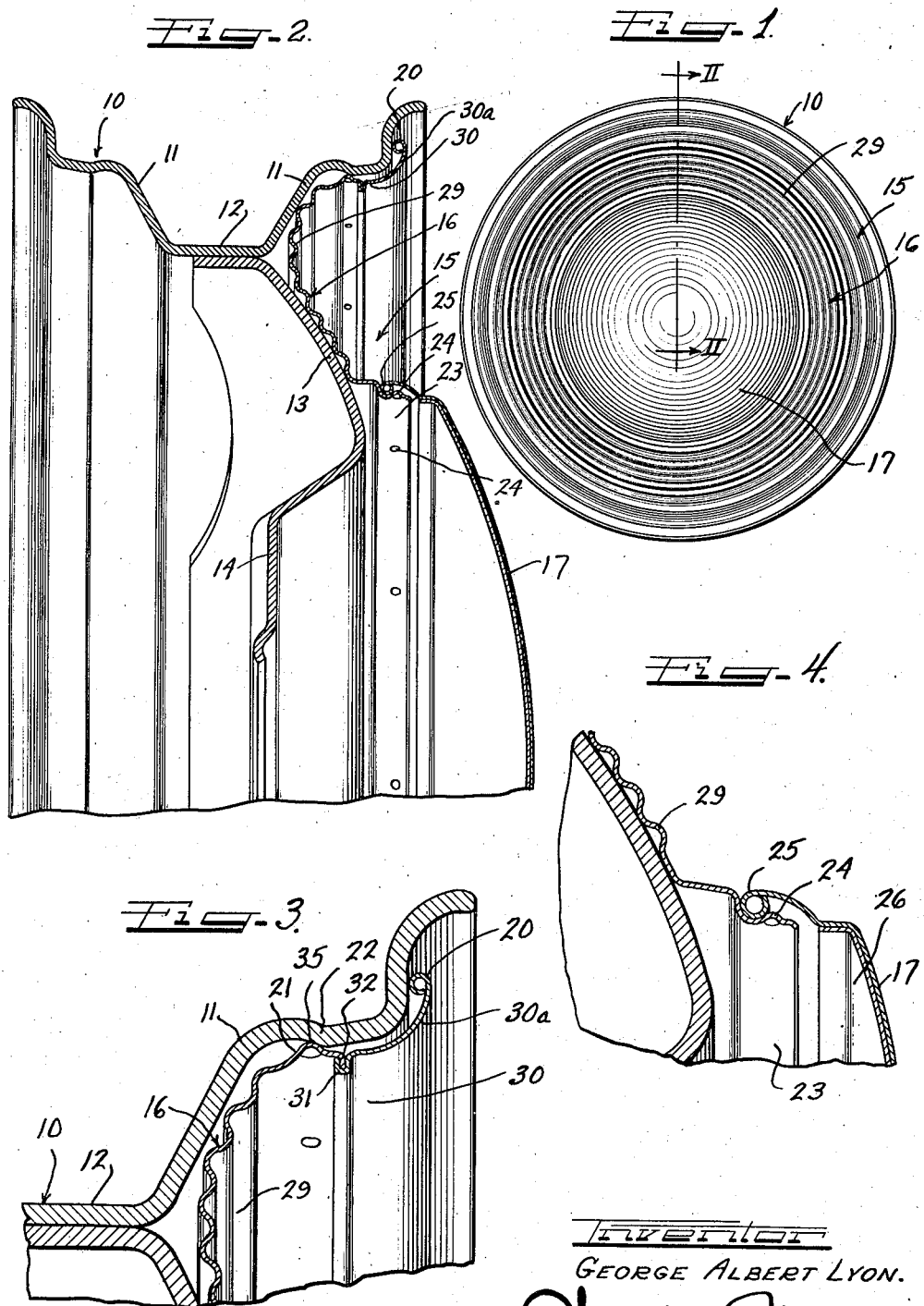
Inventor
GEORGE ALBERT LYON.
by
Attys.

Patented Oct. 9, 1945

2,386,224

UNITED STATES PATENT OFFICE 2,386,224

WHEEL STRUCTURE

George Albert Lyon, Allenhurst, N. J.

Original application November 25, 1940, Serial No. 366,972, now Patent No. 2,326,788, dated August 17, 1943. Divided and this application July 2, 1942, Serial No. 449,399

8 Claims. (Cl. 301—37)

This invention relates to a wheel structure, and more particularly to a wheel cover provided with means cooperable in a new way with the tire rim to hold the cover on the wheel. This application is a division of my copending application, Serial Number 366,972, entitled "Wheel structure," filed November 25, 1940, now matured into Patent No. 2,326,788, issued August 17, 1943.

An object of this invention is to provide a simple and inexpensive wheel cover having means arranged to enable the cover to be sprung into retained detachable engagement with the tire rim of the wheel.

Still another object of this invention relates to the provision of a multi-part cover member wherein the outer part is spring retained in cooperation with the rim of the wheel and wherein the inner part comprises a hub cap snapped into detachable retained engagement with a flange on the outer part of the cover.

In accordance with the general features of this invention, there is provided in a wheel structure including a flanged and shouldered tire rim, a wheel cover cooperable with a shoulder of the rim which comprises a circular member provided with a ring-like portion having a plurality of radially outwardly projecting indentations and flexible over and behind the rim shoulder whereby the cover may be sprung into retained detachable engagement with the tire rim.

Another feature of the invention relates to making the cover of two concentric circular parts, the outer of which is sprung into detachable retained engagement with the tire rim, and the inner of which comprises a hub cap provided with a continuous rear inner edge adapted to be sprung over cooperating bumps on a flange of the outer cover parts.

Other objects and features of this invention will more fully appear from the following detailed description taken in connection with the accompanying drawing in which:

Figure 1 is a side elevation of a wheel and cover structure embodying the features of this invention;

Figure 2 is an enlarged fragmentary cross sectional view taken on the line II—II of Figure 1 looking in the direction indicated by the arrows;

Figure 3 is a sectional view corresponding to the upper right-hand portion of Figure 2 but drawn on an enlarged scale; and Figure 4 is a sectional view corresponding to the central portion of Figure 2, but drawn to a slightly enlarged scale.

The reference character 10 designates generally a drop center type of tire rim which is made up of a plurality of side flanges or shoulders 11 and a base flange 12, the latter of which is suitably fastened to the wheel body or spider 13. The body 13 is of the usual bulged or convex cross section and has the usual central wheel bolt-on flange 14.

Cooperable with this wheel is a multi-part wheel cover embodying the features of this invention and designated generally by the reference character 15. This wheel cover includes two concentric circular parts 16 and 17 which are made from suitable sheet metal. I have obtained excellent results by making wheel covers from stainless steel sheet and from 18–8 steel sheet having a thickness in the neighborhood of .020 of an inch. It is, of course, to be understood that any suitable sheet material may be used, as long as it has the requisite rigidity and resiliency to accomplish the objectives of my invention.

The outer cover part 16 is in the form of an annulus and is shaped generally to conform with the contour of the surfaces of the portions of the rim and body over which it is disposed; however, preferably it is corrugated to enhance its rigidity and resiliency. This outer cover part is made up of two sections comprising the corrugated part 29 and the outer ring like part 30 which are joined together into an integral annulus by a lock seam or bead 31. This bead is formed by turning the inner edge of part 30 back upon itself as indicated at 31 and by turning the outer edge 32 of part 29 inside of the turned inner edge 31 of part 30. In actual practice, the turned edge 32 is disposed along the inner edge of the ring 30, and this inner edge is then turned as indicated at 31 about the edge 32 to lock the two parts together. For all intents and purposes, however, once the parts are locked together, they comprise a single annulus 16. This annulus includes a generally axially extending portion 21. This portion 21 is provided with a plurality of outwardly extending protuberances 35 adapted to be sprung over the shoulder 22 on the tire rim.

From the foregoing, it will be perceived that the seam 31 reinforces the cover adjacent the point where it flexes in the act of swinging the bumps 35 over and into retaining cooperation with the shoulder 22. The parts 29 and 30 are joined together to provide a generally axially extending portion which is adapted to overlie a generally axially extending flange 11 of the ring. The outer extremity of the portion 30 is curved into a generally radially extending portion 30a reinforced by a turned bead 20. This bead may be contiguous with the adjoining flange 11 or it may be spaced therefrom as desired, depending upon the construction of the cover. The turned edge or bead 20 is advantageous in that it provides a reinforced area on the wheel cover adapted to be engaged by a pry-off tool when it is desired to forcibly eject the wheel cover from the wheel.

As noted before, the cover part 16 is in the form of an annulus and extends over a part of the exposed outer surface of the tire rim, as well as over a portion of the wheel body 13. The inner edge of this annulus 16 is bent axially outwardly into a flange 23 which is provided with a plurality of spaced outwardly projecting radial protuberances 24. These protuberances 24 are cooperable with the rear inner beaded edge 25 of the hub cap part 17. By reason of the fact that the edge 25 is continuous, it follows that when the hub cap is pressed into cooperation with the bump 24, the edge 25 is distorted out of its normal circular shape, so that it passes over the bumps to the rear surfaces thereof to retain the hub cap on the part 16.

The beaded edge 25 is not permitted to reassume its normal circular shape when it is on the flange 23, and as a consequence it exerts a resilient pressure on the bumps thereby retaining the hub cap in position.

It should be noted that the hub cap is of a generally concavo-convex cross section and is reinforced at its crown by an inner circular shell 26 suitably secured in place inside of the central portion of the hub cap.

It will be observed that in the construction shown herein I utilize the rim shoulder in the retaining of the wheel cover on the wheel. This shoulder is one of two provided in the rim flanges to prevent slipping or sliding of the tire beads toward the base flange of the rim. Without such shoulders there is a marked tendency of the beads sliding transversely toward the rim base flange 12 when the tire is punctured and thereby occasioning damage to or excessive wear of the tire. Thus these shoulders are employed for a dual function in my novel wheel construction.

I claim as my invention:

1. In a wheel structure including a flanged and shouldered tire rim, the shoulder in said rim being in an axial flange of the rim and comprising a radially depressed annular section defining on one side of the rim a seat for a tire bead and on the other side a cover retaining shoulder, a wheel cover cooperable with said shoulder of said rim comprising a circular member provided with a ring like portion having a continuous annular rib projecting substantially radially inwardly therefrom, and a plurality of spaced bumps projecting radially therefrom for contacting the rim shoulders, said bumps being disposed axially inwardly from said rib, and in the vicinity thereof whereby the area of said cover containing said bumps is rigidified.

2. In a wheel structure including a flanged and shouldered tire rim, a wheel cover cooperable with the shoulder of said rim, comprising a circular member provided with a ring like portion having a plurality of spaced, outwardly extending bumps projecting substantially radially therefrom and flexible over and behind said rim shoulder whereby the cover may be sprung into retained detachable engagement with said tire rim, said cover including two concentric circular parts the outer of which includes said portion and the inner of which comprises the hub cap, said outer cover part comprising an annulus the inner edge of which is formed into an outwardly extending flange forming a seat for said hub cap part, said flange having a plurality of outwardly extending bumps, and said hub cap part including a continuous rear edge sprung over said bumps into retained detachable engagement with said flange.

3. In a wheel structure including a flanged and shouldered tire rim, as well as a body part, the shoulder in said rim being in an axial flange of the rim and comprising a radially depressed annular section defining on one side of the rim a seat for the tire bead and on the other side a cover retaining shoulder, a wheel cover cooperable with said shoulder of said rim comprising a circular member having a substantially axially disposed portion provided with a plurality of spaced bumps projecting substantially radially outward therefrom, and flexible over and behind said rim shoulder whereby the cover may be sprung into retained detachable engagement with said tire rim, said cover including two concentric circular parts, the outer of which includes said means and the inner of which comprises a hub cap, one of said parts having a plurality of radially projecting bumps, and the other having a continuous circular edge adapted to be sprung over and behind said bumps to retain said other member on the former.

4. In a wheel structure including a flanged and shouldered tire rim, the shoulder in said rim being in an axial flange of the rim and comprising a radially depressed annular section defining on one side of the rim a seat for the tire bead and on the other side a cover retaining shoulder, said wheel cover cooperable with said shoulder of said rim comprising a circular member provided with a ring like portion having a plurality of bumps struck therefrom and projecting substantially radially outwardly therefrom and flexible over and behind said rim shoulder whereby the cover may be sprung to retained detachable engagement with said tire rim, said cover comprising two concentric parts lock seamed together in a radially inwardly extending rib disposed in the vicinity of said bumps whereby the area of said cover containing said bumps is rigidified.

5. In a wheel structure including a flanged and shouldered tire rim, as well as a body part, the shoulder of said rim being in an axial flange of the rim and comprising a radially depressed annular section defining on one side of the rim a seat for the tire bead and on the other side a cover retaining shoulder, a wheel cover cooperable with said shoulder of said rim comprising a circular member having a plurality of spaced bumps projecting substantially radially outward therefrom and flexible over and behind said rim shoulder and an inwardly extending rib disposed adjacent to said bumps to rigidify the cover area containing the same, said bumps being flexible over and behind said rim shoulder whereby the cover may be sprung into out of round detachable engagement with the tire rim, said cover including two concentric circular parts the outer of which includes said bumps and the inner of which comprises a hub cap, one of said parts having a plurality of radially projecting bumps and the other having a continuous circular edge adapted to be sprung over and behind said bumps to retain said other member on the former.

6. As an article of manufacture, a wheel cover cooperable with a rigid shoulder of a tire rim comprising a circular member provided with a generally radially extending portion and a generally axially extending ring like portion having a plurality of spaced radially outwardly projecting bumps thereon and a trim ring disposed in concentric relation with said circular member and having its inner edge lock seamed together with the outer edge of said generally axially extending ring-like portion of the circular member to afford a radially projecting rib for rigidifying the area of the cover containing said bumps.

7. As an article of manufacture, a wheel cover cooperable with a rigid shoulder of a tire rim comprising a circular member provided with a generally axially extending ring like portion having a plurality of spaced radially outwardly projecting bumps thereon and a trim ring disposed in concentric relation with said circular member and having its inner edge lock seamed together with the outer edge of said circular member to afford a radially projecting rib for rigidifying the area of the cover containing said bumps, a generally axially extending ring like portion at the inner peripheral margin of said circular member, a plurality of spaced bumps projecting substantially radially outwardly from said ring like member, and a hub cap portion having a beaded substantially axially extending outer edge flexible over and behind said last named bumps whereby the hub cap may be sprung into retained detachment with said circular member.

8. In a wheel structure including a wheel having tire rim and central load bearing parts, a multi-part wheel trim construction including an outer trim ring section for disposition over the rim part, a hub cap section for disposition over the central load bearing part and an intermediate trim section arranged for retaining engagement with a part of the wheel for retainingly engaging said outer trim ring section and the hub cap section to retain the same as a unit on the wheel, said intermediate section and the cooperating wheel rim part having interengaging shoulder and recessed means brought into cooperation by a snap-on engagement of the intermediate trim section.

GEORGE ALBERT LYON.